United States Patent
Yamazaki et al.

(10) Patent No.: US 9,714,027 B2
(45) Date of Patent: Jul. 25, 2017

(54) METHODS AND SYSTEMS FOR STARTING AN ENGINE

(71) Applicant: Ford Global Technologies, LLC, Dearborn, MI (US)

(72) Inventors: Mark Steven Yamazaki, Canton, MI (US); Jeffrey Allen Doering, Canton, MI (US); Wei Liang, Farmington Hills, MI (US); Rajit Johri, Ann Arbor, MI (US); Xiaoyong Wang, Novi, MI (US); Ming Lang Kuang, Canton, MI (US); Scott Thompson, Waterford, MI (US); David Oshinsky, Trenton, MI (US); Dennis Reed, Dexter, MI (US); Adam Banker, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 143 days.

(21) Appl. No.: 14/462,405

(22) Filed: Aug. 18, 2014

(65) Prior Publication Data

US 2016/0046282 A1    Feb. 18, 2016

(51) Int. Cl.
| | |
|---|---|
| *B60W 10/02* | (2006.01) |
| *B60W 20/40* | (2016.01) |
| *B60W 10/08* | (2006.01) |
| *B60W 30/19* | (2012.01) |
| *B60W 10/06* | (2006.01) |
| *B60W 10/115* | (2012.01) |
| *B60W 20/30* | (2016.01) |

(52) U.S. Cl.
CPC ............ *B60W 20/40* (2013.01); *B60W 10/02* (2013.01); *B60W 10/06* (2013.01); *B60W 10/08* (2013.01); *B60W 10/115* (2013.01); *B60W 20/30* (2013.01); *B60W 30/19* (2013.01); *B60W 2710/0605* (2013.01); *B60W 2710/0644* (2013.01); *B60W 2710/1005* (2013.01); *Y02T 10/6286* (2013.01); *Y10S 903/93* (2013.01)

(58) Field of Classification Search
CPC .... B60W 20/40; B60W 20/30; B60W 10/115; B60W 10/06; B60W 10/08; B60W 30/19; B60W 10/02; B60W 2710/0605; B60W 2710/0644; B60W 2710/1005
See application file for complete search history.

(56) References Cited

U.S. PATENT DOCUMENTS

| | | | |
|---|---|---|---|
| 4,133,325 | A | 1/1979 | West |
| 4,819,171 | A | 4/1989 | Morita |
| 5,886,625 | A | 3/1999 | Uto et al. |

(Continued)

OTHER PUBLICATIONS

Nedorezov, Felix et al., "Methods and Systems for Starting an Engine," U.S. Appl. No. 14/462,401, filed Aug. 18, 2014, 42 pages.

*Primary Examiner* — David J Hlavka
(74) *Attorney, Agent, or Firm* — David Kelley; McCoy Russell LLP

(57) ABSTRACT

Methods and systems are provided for improving engine restart operations occurring during a transmission shift in a hybrid vehicle. Engine speed is controller during cranking and run-up to approach a transmission input shaft speed that is based on the future gear of the transmission shift. Engine speed is controlled via adjustments to spark, throttle, and/or fuel, to expedite engine speed reaching the synchronous speed.

9 Claims, 5 Drawing Sheets

(56) References Cited

U.S. PATENT DOCUMENTS

| | | |
|---|---|---|
| 7,351,182 B2* | 4/2008 | Kobayashi ............... B60K 6/48 |
| | | 477/5 |
| 7,896,114 B2 | 3/2011 | Colvin et al. |
| 8,157,035 B2 | 4/2012 | Whitney et al. |
| 8,343,615 B2 | 1/2013 | Raksha et al. |
| 8,386,150 B2 | 2/2013 | Whitney et al. |
| 8,602,941 B2 | 12/2013 | Cullen et al. |
| 8,628,451 B2 | 1/2014 | Sah et al. |
| 2007/0102211 A1* | 5/2007 | Nozaki .................... B60K 6/48 |
| | | 180/65.7 |
| 2007/0259755 A1* | 11/2007 | Tanishima ............. B60K 6/387 |
| | | 477/3 |
| 2009/0308674 A1 | 12/2009 | Bhattarai et al. |
| 2012/0065819 A1 | 3/2012 | Christman et al. |
| 2013/0296108 A1 | 11/2013 | Ortmann et al. |
| 2013/0297105 A1 | 11/2013 | Yamazaki et al. |
| 2014/0088805 A1 | 3/2014 | Tulpule et al. |
| 2014/0100081 A1 | 4/2014 | Cullen et al. |
| 2014/0100082 A1 | 4/2014 | Gibson et al. |
| 2014/0222270 A1* | 8/2014 | Tsutsumi ............. B60W 20/40 |
| | | 701/22 |
| 2015/0051767 A1* | 2/2015 | Mohri .................. B60L 11/005 |
| | | 701/22 |
| 2015/0080175 A1* | 3/2015 | Kobayashi ............... B60K 6/48 |
| | | 477/5 |
| 2015/0126329 A1* | 5/2015 | Johri .................... B60W 10/08 |
| | | 477/5 |
| 2015/0353068 A1* | 12/2015 | Nefcy .................. B60W 10/06 |
| | | 701/22 |

\* cited by examiner

METHODS AND SYSTEMS FOR STARTING AN ENGINE

FIELD

The present description relates to systems and methods for improved engine speed control during an engine restart. The engine may be selectively coupled to an electrical machine and a transmission in a hybrid electric vehicle.

BACKGROUND AND SUMMARY

Hybrid electric vehicles (HEV's) utilize a combination of an internal combustion engine with an electric motor to provide the power needed to propel a vehicle. This arrangement provides improved fuel economy over a vehicle that has only an internal combustion engine in part due to the engine being shut down during times when the engine operates inefficiently, or is not otherwise needed to propel the vehicle. During these conditions, the vehicle is transitioned from an engine mode to an electric mode where the electric motor is used to provide all of the power needed to propel the vehicle. When the driver power demand increases such that the electric motor can no longer provide enough power to meet the demand, or if the battery state of charge (SOC) drops below a certain level, the engine is restarted. Vehicle propulsion is then transitioned from an electric mode to an engine mode.

One method of enabling a smooth engine restart in an HEV powertrain is disclosed by Tulpule et al. in US 20140088805. Therein, a disconnect clutch is disposed between an engine and a motor, which is operable to disconnect the engine from the motor. During an engine restart, the disconnect clutch is disengaged so that the engine can be fueled to obtain a speed that matches the motor speed. Then, when the engine speed matches the motor speed, the disconnect clutch is engaged to couple the engine and the motor to the drive shaft to meet the driver torque demand. In another example disclosed by Sah et al. in U.S. Pat. No. 8,628,451, engine speed and transmission input speed is synchronized when an oncoming clutch is activated and an outgoing clutch is deactivated. However the inventors have recognized potential issues with such an approach. As an example, if there is any speed difference between the engine and the impeller (or motor) speed, there may be substantial driveline disturbance and NVH caused when the disconnect clutch is closed. As such, there may be a difficulty in predicting the target speed at which the engine speed controller achieves synchronous speed for the disconnect clutch to close. This difficulty arises from the motor being used to propel the vehicle while the engine is being restarted, which results in the motor speed changing constantly. For example, while the engine is at 150-200 rpm, the motor speed may be as low as 600-700 rpm or as high as 2000 rpm. Predicting the target speed may become more difficult if a transmission shift is requested during the engine restart. For example, if a driver requests increased acceleration while the engine is being restarted, the transmission may command a downshift concurrent with the engine restart. If the engine speed control is targeted to the higher speed of the gear existing when the engine restart was initiated, a higher level of airflow and fuel may be commanded to accelerate the engine quickly to the higher speed. If the transmission changes to the lower gear of the transmission shift at an inopportune time, the engine speed may overshoot the motor speed in the reduced gear and lead to significant driveline disturbance. This can result in vehicle surge and NVH issues. In the same way, if a driver requests decreased acceleration while the engine is being restarted, the transmission may command an upshift concurrent with the engine restart. If the engine speed control is targeted to the lower speed of the gear existing when the engine restart was initiated, a lower level of airflow and fuel may be commanded to accelerate the engine quickly to the lower speed. If the transmission changes to the higher gear at an inopportune time, there is a high likelihood that the engine speed will undershoot the motor speed in the higher gear and lead to significant driveline disturbance. As such, this can result in vehicle stall and NVH issues.

The inventors have recognized these issues and developed a method for a hybrid vehicle with an improved engine restart method. In one example, a driveline method comprises: during engine starting of a moving vehicle, the engine starting during a transmission shift transition, adjusting an engine speed based on a future gear of the transmission shift; and closing a disconnect clutch before completion of the transmission shift. In this way, engine speed can be controlled to a synchronous speed based on the future gear, reducing driveline disturbances.

As an example, while a vehicle is propelled via motor torque from an electric motor, an engine restart request may be received. Accordingly, the engine may be cranked via the electric motor with a disconnect clutch coupled between the engine and motor at least partially open. Following cranking, engine fueling may be resumed and the engine speed may be controlled to a synchronous speed after which the disconnect clutch may be closed. If the engine is restarted during a transmission shift transition, the engine speed may be controlled to match a transmission input shaft speed based on the future gear of the transmission following the transmission shift. For example, if the engine is restarted during a transmission downshift from a first, higher gear to a second, lower gear, the downshift commanded due to the operator requesting acceleration during the engine restart, the vehicle controller may adjust engine parameters to control the engine speed profile towards the lower transmission input shaft speed expected in the second gear, rather than the higher transmission input shaft speed expected in the first gear. Then, when the engine speed matches the synchronous speed, the disconnect clutch may be closed, and thereafter the transmission shift may be completed (e.g., the second gear may be engaged). This allows the engine speed to not undershoot the required synchronous speed at the time of disconnect clutch closing, reducing NVH issues.

In this way, a quality of engine restarts in a hybrid electric vehicle, such as those performed concurrent to a transmission shift, may be improved. By controlling the engine speed during a run-up phase of an engine restart so as to better match a future gear of the transmission shift, rather than a current gear, NVH issues and driveline torque disturbances associated with speed underestimation or overestimation can be reduced. By predicting a synchronous speed expected at the time of disconnect clutch closing based on the nature of the transmission shift, vehicle stalls and bumps may be averted. Overall, a smoother engine restart with reduced NVH issues is enabled, improving operator drive experience.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
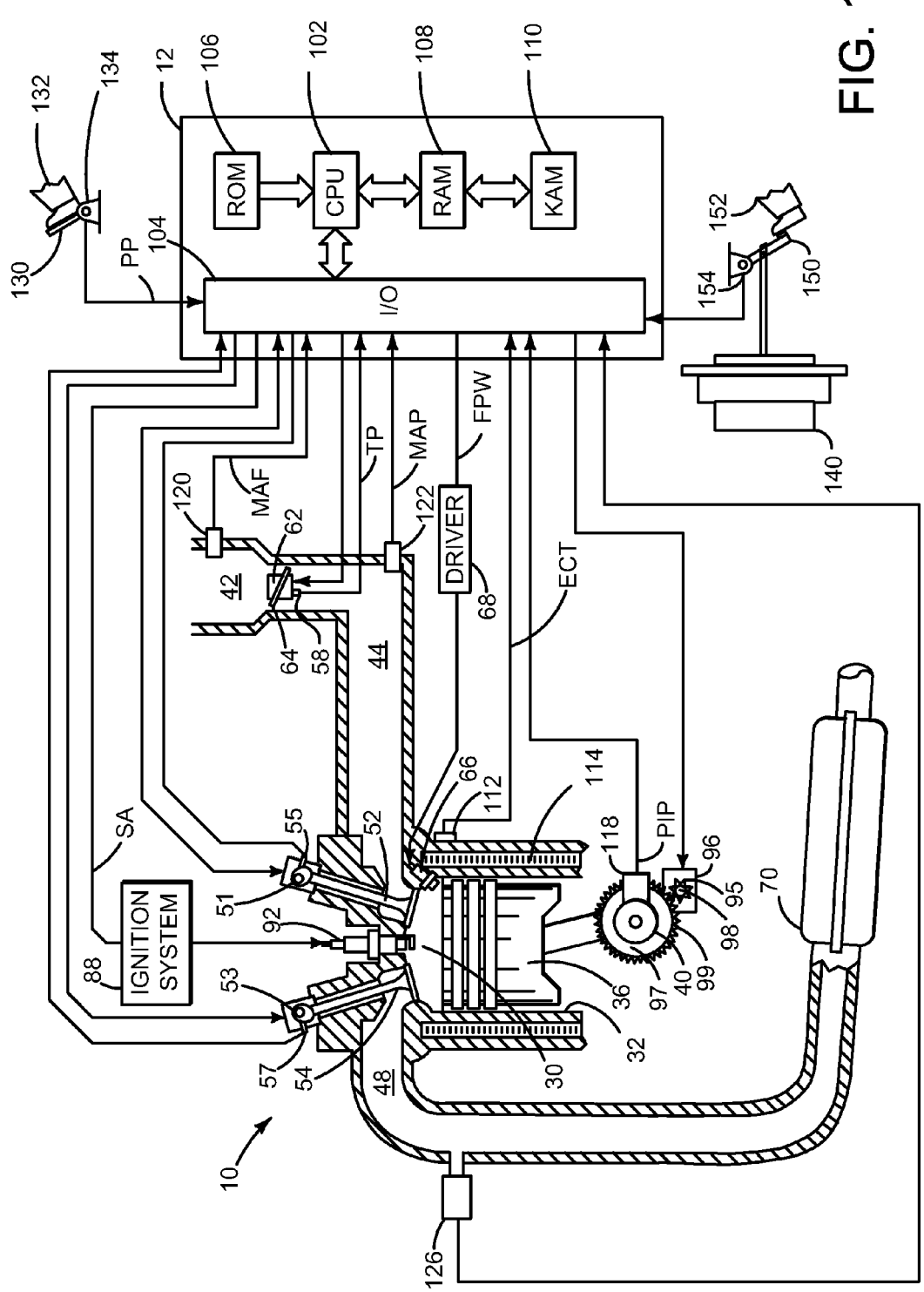
FIG. 1 is a schematic diagram of an engine.
Figure 2:
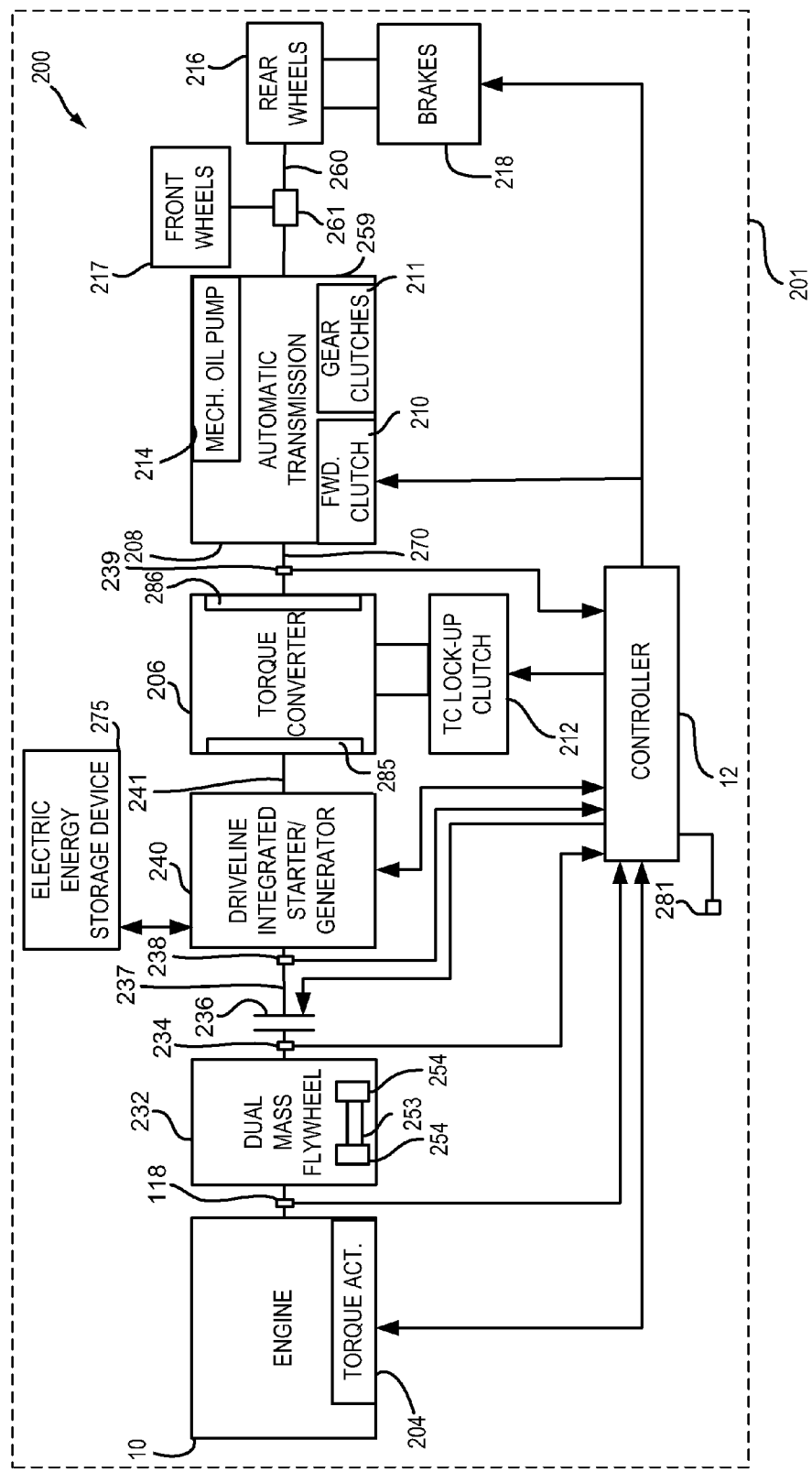
FIG. 2 shows an example driveline configuration for a hybrid electric vehicle.
Figure 4:
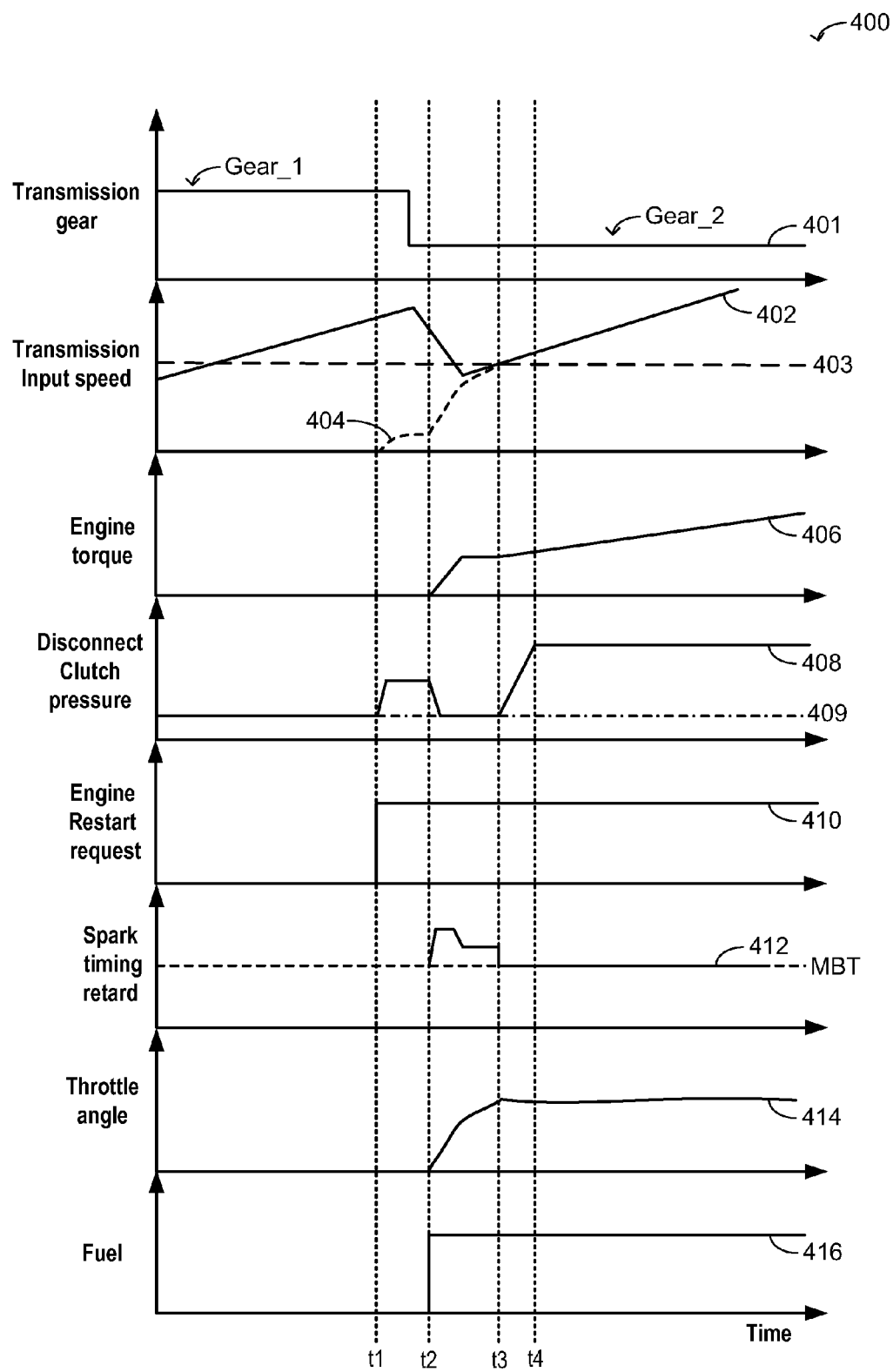
FIGS. 4-5 show example engine restart sequences occurring during and outside of a transmission shift transition.
Figure 5:
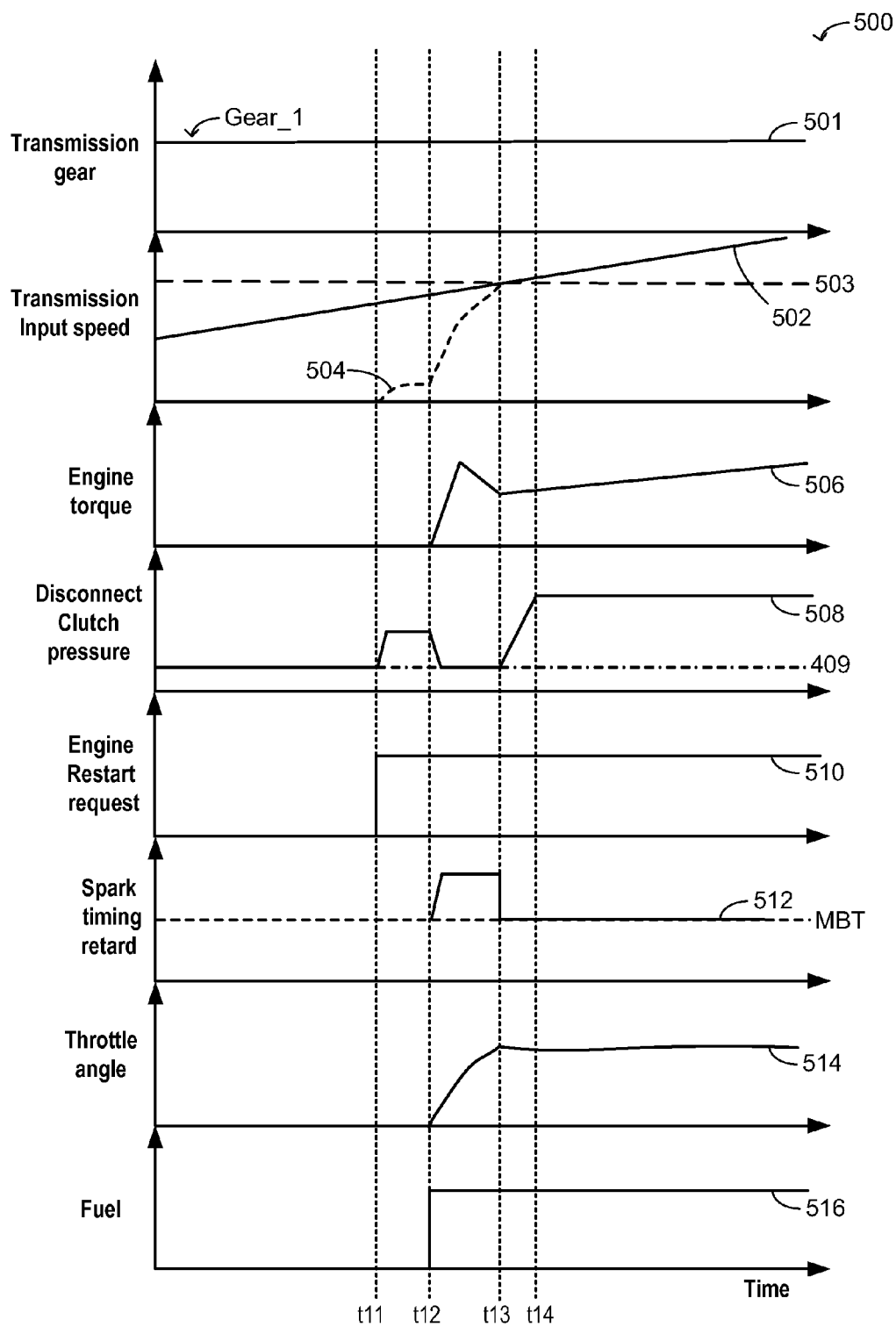

Methods and systems are provided for enabling smooth engine restarts in a hybrid electric vehicle, such as the vehicle system of FIGS. 1-2. During conditions when an engine restart operation overlaps with a transmission shift event, engine speed may be controlled so as to run-up the engine to a speed that better matches the future gear of the transmission shift event. A vehicle controller may be configured to perform a control routine, such as the example routine of FIG. 3, to crank the engine using motor torque while slipping a disconnect clutch coupled between the engine and the motor. After resuming engine fueling, the vehicle controller may control the engine speed profile so as to raise the engine speed to a predicted synchronous speed that is based on the gear of the transmission after the transmission shift is completed. The engine speed may be controlled via adjustments to engine parameters such as throttle angle and spark timing. Example engine restart sequences are shown at FIGS. 4-5. In this way, a smooth engine restart is achieved.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes or regenerative braking via a driveline integrated starter/generator (DISG) may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with an engine starting system shown in FIG. 1 or via a driveline integrated starter/generator DISG 240. Further, engine 10 may generate or adjust torque via torque actuator 204, such as a fuel injector, throttle, etc.

An engine output torque may be transmitted to an input side of dual mass flywheel (DMF) 232. Engine speed as well as dual mass flywheel input side position and speed may be determined via engine position sensor 118. Dual mass flywheel 232 may include springs 253 and separate masses 254 for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

When disconnect clutch 236 is fully engaged (or closed), the engine output shaft is coupled to the DISG, allowing the motor to start the engine, such as during an engine restart. In contrast, when disconnect clutch 236 is fully disengaged (or open), the engine may be disconnected from the electric machine. Disconnecting the engine from the electric machine allows the electric machine to propel the vehicle without having to overcome parasitic engine losses. Further still, the disconnect clutch may be partially engaged and slipped to vary the disconnect clutch's torque capacity. As elaborated at FIG. 3, controller 12 may be configured to adjust the amount of torque transmitted to crank the engine by adjusting the disconnect clutch 236 during an engine restart. The clutch may then be closed when the engine speed reaches a synchronous speed that is based on a current or predicted transmission input shaft speed.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 206 by adjusting the torque converter lock-up clutch 212 in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are met, when the vehicle speed is close to zero, or other engine shutdown conditions are met, such as when the engine is shutdown at higher speeds (e.g. during electric only or brake regeneration operation), controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle.

If the vehicle is being launched from zero speed, a wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming cylinder combustion.

Thus, in the vehicle system of FIGS. 1-2, the vehicle is equipped with a modular hybrid transmission (MHT). As described above, the powertrain has a conventional step ratio automatic transmission in which a "front module", with the electric machine (the DISG) and the disconnect clutch, is inserted between the engine and the transmission input. The DISG is thereby permanently connected to the transmission input (e.g., to the torque converter impeller or to a launch clutch). The disconnect clutch is then used to connect or disconnect the engine, thereby making electric only drive possible.

As such, engine starts are accomplished by controlling the disconnect clutch to vary torque provided from the electric machine to crank the engine. When the engine is rotated a sufficient number of crank angle degrees, fuel and spark is then applied to accelerate the engine crankshaft, and/or flywheel, to the synchronous, or output, speed of the disconnect clutch. As the output side of the disconnect clutch is rigidly connected to the transmission input through the electric machine rotor, the disconnect clutch output is equal to the transmission input speed. To reduce drive line disturbance during the engine restart event, as described below, a controller may reduce disconnect clutch torque capacity or maintain it at a level when significant clutch slip allows the engine to run up to the synchronous speed. At that point the disconnect clutch can be fully applied or engaged without noticeable torque disturbance.

As such, if there is any speed difference between the engine and the impeller speed, driveline disturbances are caused when the disconnect clutch is closed. However, while the engine is being restarted, the motor continues to propel the vehicle. This results in a constant change in the motor speed. Consequently, it may be difficult to accurately predict the target synchronous speed at which the disconnect clutch will close. If the vehicle operator requests acceleration or deceleration while the engine is being restarted, it may be result in a transmission shift which may make predicting the target speed even more difficult. For example, if the engine is restarted in the middle of a transmission downshift transition, the vehicle controller may close the disconnect clutch at a synchronous speed based on the current gear. However, if the transmission downshift occurs before the disconnect clutch is closed, the engine may have already increased airflow and fueling to quickly accelerate to the higher speed of the higher gear. Consequently, at the time of disconnect clutch closing, the engine speed may overshoot, resulting in a driveline disturbances experienced by the vehicle operator as a bump of clunk. Likewise, if the engine restart occurs in the middle of a transmission upshift transition, there is a possibility of the engine speed undershooting the target speed at the time of clutch engagement, resulting in a driveline disturbance that causes a vehicle stall.

Figure 3:
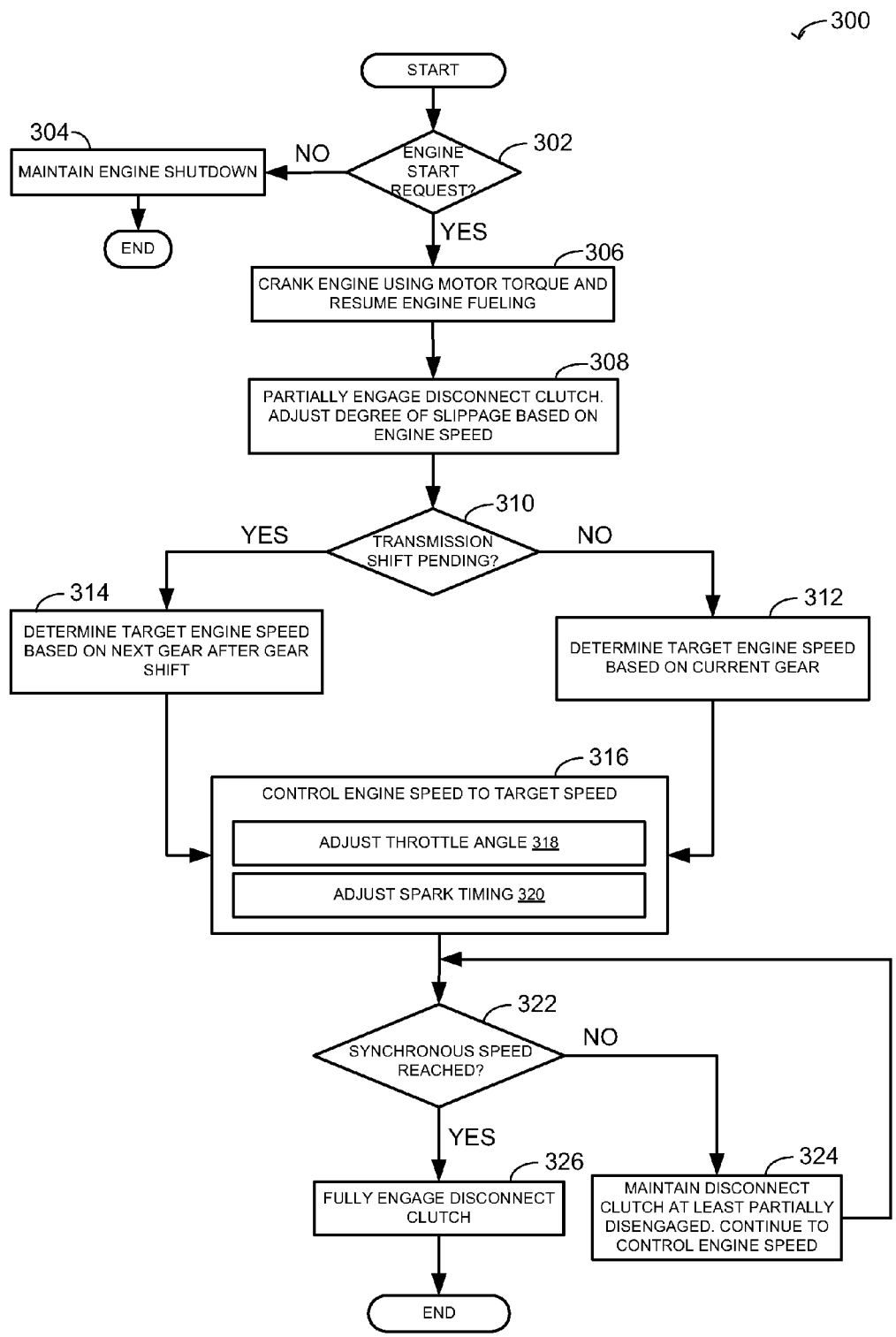
FIG. 3 shows an example method for restarting an engine of a hybrid electric vehicle during a transmission shift.

As elaborated herein, with reference to the methods of FIG. 3, a controller may smoothly restart an engine during an engine restart using the system of FIGS. 1-2. Therein, during engine starting of a moving vehicle, such as a hybrid vehicle being propelled via motor torque from an electric motor, and wherein the engine is started during a transmission shift transition, an engine speed is adjusted based on a future gear of the transmission shift, and the disconnect clutch is closed before completion of the transmission shift. In particular, the engine speed is adjusted based on the future gear of the transmission shift so that the engine speed is raised to a synchronous speed of the future gear of the transmission shift. The controller may adjust the engine speed by adjusting parameters such as spark timing, throttle angle, and fuel injection based on the future gear of the transmission shift. In this way, a smooth engine restart is enabled with reduced driveline disturbances.

Now turning to FIG. 3, an example method 300 is provided for smoothly starting an engine. In the present example, the engine is restarted while the vehicle is moving using motor torque in an electric drive mode to transition the vehicle to being operated in a hybrid mode based on the user's torque demands.

At 302, the routine includes confirming that an engine restart request has been received. The engine restart may be requested responsive to an increased torque demand from a vehicle operator. As another example, an engine restart may be requested responsive to a system battery state of charge being lower than a threshold. If an engine restart request is confirmed, routine 300 proceeds to 306. Otherwise, the routine proceeds to 304 where the engine is maintained shut down while the vehicle is continued to be propelled via motor torque.

At 306, the routine includes cranking the engine via a motor. In particular, the engine is cranked from rest (that is, 0 rpm). Then, once the engine has been cranked to a threshold speed, engine fueling may be resumed so that cylinder combustion can be used to spin the engine and run up the engine speed. In one example, the engine may be cranked using motor torque from the DISG. In an alternate example, the engine may be cranked using at least some motor torque from a starter motor. Cranking the engine via the motor may include transiently increasing the torque output of the motor so as to provide sufficient torque to propel the vehicle and crank the engine. At 308, while cranking the engine via the motor, a disconnect clutch coupled between the engine and the motor in the driveline may be at least partially disengaged. That is, the engine may be cranked via the motor with the disconnect clutch at least partially open. The disconnect clutch being at least partially disengaged or open includes the disconnect clutch being slipped. A degree of slippage of the disconnect clutch may be adjusted based on engine speed. For example, the degree of slippage may be adjusted based on the rate of change of engine speed during the cranking, that is, based on the engine acceleration. In another example, the degree of slippage may be adjusted based on a difference between the engine speed and the motor speed across the disconnect clutch. By partially disengaging the disconnect clutch, and varying the degree of slippage of the clutch, the clutch's torque capacity is varied while the engine is started, without a loss of output torque delivered to the drive wheels.

In one example, the engine may be cranked to first speed, such as to 150-200 rpm, unfueled, using motor torque with the disconnect clutch coupled between the engine and the motor at least partially disengaged. When the engine cranking speed reaches a threshold speed, such as at or above 150-200 rpm, engine fueling is resumed.

At 310, it may be determined if there is a transmission shift that is pending. The transmission may be a fixed gear ratio transmission having a plurality of gears. The transmission may be shifted from a first gear to a second gear in response to vehicle conditions. In one example, a transmission shift may be commanded after the engine restart has been initiated due to a change in operator torque demand during the restart. For example, in response to an operator demand for more acceleration, a transmission upshift may be commanded. In another example, in response to an operator demand for deceleration (or less acceleration), a transmission downshift may be commanded. In response to the transmission shift command, the transmission may be transitioned from a first, current gear to a second, future gear while the engine is being restarted. In other words, the transmission shift transition and the engine speed run-up during the restart may at least partially overlap.

If a transmission shift is not pending, then at 312, the routine includes determining a target engine synchronous speed based on the current transmission gear. For example, an engine speed matching a transmission shaft input speed at the current gear may be determined to be the target speed. Then, at 316, the engine speed may be adjusted during the run-up phase of the engine start to being the engine speed up to the determined target speed. This may include adjusting one or more of spark timing (at 320), throttle angle (at 318) and fuel injection based on the current gear of the transmission.

In one example, the spark and throttle adjustment performed to control the engine speed to the target synchronous motor speed may be based on the impeller speed. In particular, at lower impeller speeds, spark timing retard may be increased (e.g., spark may be heavily retarded) and throttle opening may be decreased (e.g., throttle may be closed on every event) to avoid raising the engine speed above the target speed for improved driveability. In comparison, at higher impeller speeds, spark timing retard may be decreased (e.g., spark may be advanced) and throttle opening may be increased (e.g., throttle may be opened on every event) to raise the engine speed to the target speed quickly.

If a transmission shift is pending, then at 314, the routine includes determining a target engine synchronous speed based on the future gear of the transmission shift. That is, where the transmission is being shifted from a first gear to a second gear, the target speed may be determined based on the second gear and not the first gear, even if the engine restart was initiated while the transmission was in the first gear. Then, at 316, the engine speed may be adjusted to a synchronous speed of the future gear (herein the second gear) of the transmission shift. This includes adjusting one or more of spark timing (at 320), throttle angle (at 318) and fuel injection based on the future gear of the transmission shift.

As one example, the transmission shift may be a transmission downshift (e.g., commanded responsive to a demand for increased acceleration), wherein the future gear is a lower gear having a lower synchronous speed setting relative to the current gear which is a higher gear with a higher synchronous speed setting. Herein, the adjusting may include one of decreasing an amount of spark retard, increasing an amount of spark advance, decreasing the throttle angle, and decreasing fuel injection based on the synchronous speed of the future gear of the transmission downshift being lower. In another example, the transmission shift may be a transmission upshift (e.g., commanded responsive to a demand for decreased acceleration), wherein the future gear is a higher gear having a higher synchronous speed setting relative to the current gear which is a lower gear with a lower synchronous speed setting. Herein, the adjusting may include one of increasing an amount of spark retard (or decreasing an amount of spark advance), increasing the throttle angle, and increasing fuel injection based on the synchronous speed of the future gear of the transmission upshift being higher.

In one example, the adjusting of engine fuel, spark and/or airflow to provide the desired engine speed profile to the target synchronous speed may be further based on a derivative of the current engine speed after resuming engine fueling (indicative of the engine speed trajectory) and a derivative of the current motor speed after resuming engine fueling (indicative of the motor speed trajectory). This allows the engine torque to be more accurately adjusted responsive to the predicted synchronous motor speed. In particular, based on the engine speed trajectory and the motor speed trajectory, it may be determined if the engine speed will match the synchronous motor speed at desired time of clutch engagement. As such, if the disconnect clutch is engaged while the engine speed and motor speed are not matched, driveline torque disturbances may occur which can lead to significant NVH issues (e.g., sudden jerks). In one example, if the engine speed is expected to be lower than the predicted motor speed at a desired time of clutch engagement, or if the predicted synchronous motor speed is higher than the current motor speed, the controller may adjust one or more fuel, air, and spark to the engine to increase engine acceleration. For example, fuel and/or air may be transiently increased and spark timing may be retarded to increase engine acceleration. Herein, by increasing fueling and/or retarding spark timing, a difference between the engine speed and the motor speed is reduced. As another example, if the engine speed is expected to be higher than the predicted motor speed at a desired time of clutch engagement, or if the predicted synchronous motor speed is lower than the current motor speed, the controller may adjust one or more fuel, air, and spark to the engine to decrease engine acceleration. For example, fuel and/or air may be transiently decreased and spark timing may be advanced to decrease engine acceleration.

In one example, the spark and throttle adjustment performed to control the engine speed to the target synchronous motor speed of the future gear may be based on the impeller speed. In particular, at lower impeller speeds, spark timing retard may be increased (e.g., spark may be heavily retarded) and throttle opening may be decreased (e.g., throttle may be closed on every event) to avoid raising the engine speed above the target speed for improved driveability. In comparison, at higher impeller speeds, spark timing retard may be decreased (e.g., spark may be advanced) and throttle opening may be increased (e.g., throttle may be opened on every event) to raise the engine speed to the target speed quickly.

As such, when the engine speed is below the synchronous speed, the engine may be spinning with the disconnect clutch at least partially open. That is, while the engine speed is adjusted to the synchronous speed, the disconnect clutch may be maintained partially disengaged with a degree of slippage of the partially disengaged or partially open disconnect clutch continually adjusted based on the engine speed relative to the synchronous speed. For example, when the difference between the engine speed and the synchronous speed is higher, the degree of slippage may be increased, and as the engine speed approaches the synchronous speed, the degree of slippage may be decreased.

In some examples, the engine speed profile or trajectory to the target speed may also be controlled. For example, engine speed may be initially be raised from the first speed (when engine fueling is resumed) to a second speed (which is below the target speed, but within a threshold of the second speed), at a faster rate by increasing engine fueling at a higher rate, opening the throttle angle more, and/or retarding spark timing by a larger amount. This allows the engine to be quickly accelerated to a second speed that is within a threshold of the target speed. Then, once the engine speed is at the second speed and within a threshold of the target speed, engine speed may be raised at a slower rate from the second speed to the target synchronous speed, such as by increasing engine fueling at a lower rate, decreasing the throttle angle, and/or advancing spark timing. This allows the engine to be gradually, and more deliberately, moved to the target speed. As such, this may improve the accuracy of matching the engine speed to the synchronous speed, thereby improving engine restart quality.

In some examples, the controller may also use engine speed feedback to control the engine restart speed profile. In particular, since the slip speed is closely related to the engine speed profile, by controlling the slip speed profile, a desired engine speed profile to the target synchronous speed may be achieved. The clutch slip may be related to the engine speed profile in that slip is equal to the disconnect clutch input speed (neglecting any DMF oscillation) minus the disconnect clutch output speed. Thus, the DISG speed may be used as the input speed and slip may be adjusted to achieve a desired engine speed profile (e.g., desired rate of increase in engine speed) to the target speed.

It will be appreciated that the target speed may also change during engine speed run-up. For example, engine control may be initiated when there is no transmission shift pending. Accordingly, engine speed control may be adjusted to a first target speed based on a first predicted transmission input shaft speed corresponding to a situation where there is no transmission shift. Therein, spark and throttle may be adjusted to a first setting (e.g., a first rate, a first amount of spark retard and a first amount of throttle opening). Due to a transmission shift occurring while the engine speed is being run-up to the first target speed, the target speed may be changed responsive to the shift to a second target speed corresponding to a predicted transmission input shaft speed following the shift. Thus, in the middle of the engine speed control, the target speed may be changed from the first target speed to the second target speed via readjusting of spark and throttle settings. For example, spark and throttle may be readjusted from the first setting to a second setting (e.g., a second rate, a second amount of spark retard and a second amount of throttle opening). Thus, during the run-up, the engine speed trajectory may change as the target speed changes from the first target speed to the second target speed.

At 322, it may be determined if the synchronous speed has been reached. If not, at 324, engine fueling, throttle angle and/or spark timing is adjusted to bring the engine speed to the synchronous speed while the disconnect clutch is maintained at least partially disengaged with the clutch being slipped. In addition, the slippage may continue to be adjusted based on the engine speed relative to the motor speed (or target synchronous speed).

If the engine speed is at or within a threshold distance of the target synchronous speed, then at 326, the routine includes closing the disconnect clutch. After closing the disconnect clutch, the hybrid vehicle may be propelled with at least engine torque. For example, the hybrid vehicle may be transitioned from an electric mode to a hybrid mode.

In one example, a hybrid vehicle controller may control an engine restart speed, during an engine restart, to a predicted transmission input shaft speed. In particular, where the transmission shift includes shifting a fixed gear ratio transmission from a first gear (the current gear) to a second gear (the future gear) in response to vehicle conditions, the predicted transmission input shaft speed may be based on transmission input shaft speed after beginning to engage the second gear but before the second gear is fully engaged. The shifting of the transmission may have been commanded after the engine start was initiated. Herein, the transmission shift may be a transmission downshift, with the second gear being lower than the first gear and with the predicted transmission input shaft speed (at the second gear) being lower than the transmission input shaft speed at the first gear. While propelling the vehicle with motor torque, the controller may crank the engine to a first speed, unfueled, using motor torque with the disconnect clutch between the motor and the engine at least partially disengaged. Then, the controller may adjust one or more of engine fueling (e.g., increasing engine fueling), throttle angle (e.g., increase throttle angle to increase throttle opening), and spark timing (e.g., retard spark timing) to raise the engine restart speed from the first speed to the predicted transmission input shaft speed with the disconnect clutch maintained at least partially disengaged. The disconnect clutch may be continuously slipped while the engine speed remains below the predicted transmission input shaft speed, a degree of slippage of the disconnect clutch modulated based on the engine restart speed relative to the predicted transmission input shaft speed. For example, the degree of slippage may be increased as the difference increases. Then, once the engine speed matches the predicted transmission input shaft speed, the disconnect clutch may be closed, and then the second gear may be engaged. Thus, the disconnect clutch may be closed after beginning to engage the second gear but before the second gear is fully engaged.

In this way, engine restarts may be enabled with reduced driveline torque disturbances, even if a transmission shift is commanded while the engine is restarted.

Now turning to FIGS. 4-5, example restart sequences are depicted. In particular, map 400 of FIG. 4 depicts an engine restart where the engine restart coincides with a transmission shift and the engine restart speed is adjusted based on the predicted gear after the shift. In comparison, map 500 of FIG. 5 depicts an engine restart where the engine restart speed is adjusted based on the current gear.

Map 400 depicts a transmission gear selection at plot 401, a transmission input shaft speed at plot 402 (solid line) relative to an engine speed at plot 403 (dashed line), an engine torque at plot 406, a disconnect clutch pressure at plot 408, an engine restart command at plot 410, spark timing adjustments at plot 412, throttle opening adjustments at plot 414, and engine fueling at plot 416. All plots are represented over time (increasing along the x-axis from the left side to the right side of each plot).

Prior to t1, the hybrid vehicle may be operating in an electric mode with the vehicle being propelled using motor torque. In addition, based on vehicle operating conditions, the fixed gear ratio transmission may be in a first gear (gear_1).

At t1, there may be a change in operator pedal position to a position requiring more torque. Herein, the torque demand may not be met by only the motor torque and additional engine torque may be required. Thus, at t1, in response to the increase in torque demand, an engine restart command may be delivered and an engine restart event may be initiated.

In response to the engine restart command, between t1 and t2, the engine may be cranked via the motor. Before t1, the disconnect clutch may be fully open or held at a minimum degree of engagement, such as at a stroke pressure 409. Between t1 and t2, the disconnect clutch may be transiently closed or partially engaged (as indicated by the transient increase in clutch pressure) so as to enable the motor torque to be used to bump up the engine speed to a first speed wherefrom combustion can be initiated. As such, the disconnect clutch may have been held at stroke pressure 409 prior to the engine restart to allow the motor to propel the vehicle.

Also between t1 and t2, concurrent to the engine restart event, a transmission downshift is commanded. In particular, a transmission shift from the first gear (gear_1) to a second, lower gear (gear_2) is commanded. It will be appreciated that as used herein, first gear and second gear are used to refer to the order in which gears are selected rather than the gear itself. In other words, the first gear is a first gear selected on the transmission while the second gear is a subsequent gear selected on the transmission. As such, the first gear may be a transmission second gear, or an alternate, higher transmission gear. Likewise, the second gear may be a transmission first gear or an alternate, lower transmission gear.

At t2, once the engine has been sufficiently cranked to a first speed by the motor, engine fueling is resumed and cylinder combustion is initiated. Thereafter, combustion torque is used to spin the engine. While the engine is combusting, the disconnect clutch is partially disengaged via increased clutch slippage. For example, the disconnect clutch pressure may be reduced to stroke pressure 409. In response to engine fueling, engine torque output may start to increase. However, due to the engine speed not yet matching the synchronous motor speed, the disconnect clutch is not fully engaged.

After t2, the engine may be in speed control. In particular, the engine torque is commanded initially to a high value to overcome engine inertia and accelerate the engine toward the engine target speed (as indicated by first portion of plot between t2 and t3 having a steeper slope). However, the engine speed control is them modified to achieve the target lower transmission input shaft speed 403 corresponding to Gear_2 of the transmission shift, rather than the higher transmission input shaft speed corresponding to Gear_1 of the transmission shift. That is, the engine speed control is adjusted to as a function of the predicted synchronous motor speed 403 of the future gear engaged after the transmission shift rather than the current gear engaged before the transmission shift. As such, the engine speed is also adjusted based on the engine maximum torque available for acceleration and the engine inertia.

As indicated, the initial engine speed control is achieved by opening the throttle more and retarding spark from MBT. Thereafter, the engine speed is controlled to the lower target speed by opening the throttle less and advancing spark towards MBT.

In particular, the spark and throttle adjustment performed to control the engine speed to target synchronous motor speed 403 may be based on the impeller speed across the disconnect clutch. In particular, at lower impeller speeds, spark timing retard may be increased (e.g., spark may be heavily retarded) and throttle opening may be decreased (e.g., throttle may be closed on every event) to avoid raising the engine speed above the target speed for improved driveability. In comparison, at higher impeller speeds, spark timing retard may be decreased (e.g., spark may be advanced) and throttle opening may be increased (e.g., throttle may be opened on every event) to raise the engine speed to the target speed quickly.

At t3, the engine may attain the synchronous speed of the motor. Consequently, between t3 and t4, the disconnect clutch pressure is increased so that the clutch can be closed at t4.

Thereafter, engine torque may be used to propel the vehicle, while maintaining the transmission in the second gear.

Now turning to FIG. 5, map 500 depicts a transmission gear selection at plot 501, a transmission input shaft speed at plot 502 (solid line) relative to an engine speed at plot 503 (dashed line), an engine torque at plot 506, a disconnect clutch pressure at plot 508, an engine restart command at plot 510, spark timing adjustments at plot 512, throttle opening adjustments at plot 514, and engine fueling at plot 516. All plots are represented over time (increasing along the x-axis from the left side to the right side of each plot).

In FIG. 5, as in FIG. 4, prior to t11, the hybrid vehicle may be operating in an electric mode with the fixed gear ratio transmission in the first gear (gear_1). Then, at t11, due to a change in operator pedal position, an engine restart command may be delivered and an engine restart event may be initiated. Between t11 and t12, the engine may be cranked via the motor with the disconnect clutch held at stroke pressure 409. Between t11 and t12, the disconnect clutch may be partially engaged (as indicated by the transient increase in clutch pressure) so as to enable the motor torque to be used to bump up the engine speed to a first speed wherefrom combustion can be initiated. As such, the disconnect clutch may have been held at stroke pressure 409 prior to the engine restart to allow the motor to propel the vehicle.

Herein, between t11 and t12, no transmission shift is commanded, and the transmission may remain in the first gear (gear_1) for the entirety of the engine restart event. At t12, once the engine has been sufficiently cranked to a first speed by the motor, engine fueling is resumed and cylinder combustion is initiated. Thereafter, combustion torque is used to spin the engine. While the engine is combusting, the disconnect clutch is partially disengaged via increased clutch slippage. For example, the disconnect clutch pressure may be reduced to stroke pressure 409. In response to engine fueling, engine torque output may start to increase. However, due to the engine speed not yet matching the synchronous motor speed, the disconnect clutch is not fully engaged.

After t12, the engine may be in speed control. In particular, the engine torque is commanded to a high value to overcome engine inertia and accelerate the engine toward the higher engine target speed corresponding to Gear_1 of the transmission. That is, the engine speed control is adjusted to as a function of the current synchronous motor speed 503 (which is higher than the synchronous motor speed (403) of Gear_2 of the example of FIG. 4). As such, the engine speed is also adjusted based on the engine maximum torque available for acceleration and the engine inertia.

As indicated, the engine speed control to the higher target speed 503 is achieved by opening the throttle more and retarding spark from MBT. Once the target engine speed is approached or reached, spark timing is returned to MBT and throttle opening is adjusted based on engine torque requirement.

In particular, the spark and throttle adjustment performed to control the engine speed to target synchronous motor speed 503 may be based on the impeller speed across the disconnect clutch. In particular, at lower impeller speeds, spark timing retard may be increased (e.g., spark may be heavily retarded) and throttle opening may be decreased (e.g., throttle may be closed on every event) to avoid raising the engine speed above the target speed for improved driveability. In comparison, at higher impeller speeds, spark timing retard may be decreased (e.g., spark may be advanced) and throttle opening may be increased (e.g., throttle may be opened on every event) to raise the engine speed to the target speed quickly.

At t13, the engine may attain the synchronous speed of the motor. Consequently, between t13 and t14, the disconnect clutch pressure is increased so that the clutch can be closed at t14. Thereafter, engine torque may be used to propel the vehicle, while maintaining the transmission in the first gear.

It will be appreciated that while the example of FIGS. 4-5 show distinct engine speed run-ups with and without transmission shifts, in still other examples, the same engine run-up may include both conditions. For example, an engine may be restarted with no transmission shift pending and the engine speed control may be adjusted to attain a first target speed that corresponds to a first predicted transmission input shaft speed based on a current gear ratio. Thus, spark and throttle may be controlled to run-up the engine speed to the first target speed. However, in response to a transmission shift occurring while the engine is being restarted and the engine speed is being run-up to the first target speed, the controller may readjust the target speed to a second target speed that corresponds to a second predicted transmission input shaft speed based on the future gear ratio. The second target speed may be higher or lower than the first target speed based on the future gear ratio relative to the current gear ratio. Accordingly, spark and throttle may be modified during the run-up to the first target speed so as to attain the second target speed. For example, spark and throttle may be adjusted differently to attain the higher or lower target speed as compared to the target speed applicable when there was no gear shift. As an example, the first target speed may be a higher target speed corresponding to a higher current gear ratio. Thus, a larger throttle opening and a higher amount of spark retard may be applied during the restart to run-up the engine speed to the first target speed. In response to a transmission downshift occurring before the first target speed is reached, the throttle opening and the spark retard may be decreased to modify the engine speed run-up trajectory to a second target speed, lower than the first target speed, wherein the second target speed corresponds to a lower future gear ratio of the transmission downshift. In an alternate example, in response to a transmission upshift occurring before the first target speed is reached, the throttle opening and the spark retard may be further increased to modify the engine speed run-up trajectory to a second target speed, higher than the first target speed, wherein the second target speed corresponds to a higher future gear ratio of the transmission upshift.

As an example, a hybrid vehicle system may comprise an electric motor; an engine; a disconnect clutch coupled in a driveline between the engine and the motor; vehicle wheels configured to receive propulsion power from one or more of the engine electric motor and the engine via the driveline; and a fixed gear transmission including a plurality of gears, the transmission coupled to the driveline between the electric motor and the vehicle wheels. The vehicle system may further include a controller including non-transitory executable instructions for: in response to a first engine restart during a transmission shift, adjusting an engine speed during engine restarting based on a future gear of the transmission; and in response to a second engine restart outside of a transmission shift, adjusting the engine speed during the engine restarting based on a current gear of the transmission. Herein, adjusting the engine speed based on the future gear during the first restart includes adjusting the engine speed to match a transmission input shaft speed predicted based on the future gear, the predicted transmission input shaft speed lowered when the future gear is lower, the predicted transmission input shaft speed raised when the future gear is higher. In comparison, adjusting the engine speed based on the current gear during the second restart includes adjusting the engine speed to match a transmission input shaft speed predicted based on the current gear.

The controller may include further instructions for, during both the first and second engine restarts, maintaining the disconnect clutch at least partially open until the engine speed matches the predicted transmission input shaft speed, and then closing the disconnect clutch. During the first engine restart, after closing the disconnect clutch, the controller may fully engage the future gear. During both the first and second engine restarts, the controller may adjust spark timing and the position of an intake throttle based on an impeller speed estimated downstream of the motor. The impeller speed may correspond to the output of the motor speed and the input of a torque converter impeller coupled along the driveline between the motor and the transmission. In particular, during both restarts, spark timing may be retarded and the throttle may be moved to a more closed position when the impeller speed is lower. In comparison, the spark timing may be advanced and the throttle moved to a more open position when the impeller speed is higher.

The technical effect of adjusting engine speed control during an engine restart to match a target synchronous motor based on a future gear of a transmission shift occurring concurrent to the restart is that driveline torque disturbances and related NVH issues can be reduced. As such, this reduces the occurrence of vehicle lurches and stalls. In addition, engine restart and vehicle transition from electric mode to hybrid mode can be achieved substantially seamlessly, with no disturbance to the vehicle operator, even if the operator changes torque demand while the engine is being restarted. That is, engine restarts and transmission shifts can be performed concurrently. By adjusting spark timing and throttle opening during the engine run-up speed control based on an impeller speed estimated downstream of the vehicle's motor, engine driveability at lower impeller speeds is improved while allowing the target engine speed to be attained rapidly at higher impeller speeds. By reducing engine restart NVH issues, overall engine restart quality is improved and the operator's drive experience is enhanced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline method, comprising:
   during engine starting of a moving vehicle, the engine starting during a transmission shift transition,
   adjusting an engine speed based on a future gear of the transmission shift; and
   closing a disconnect clutch before completion of the transmission shift.

2. The method of claim 1, wherein the moving vehicle is a hybrid vehicle propelled with motor torque during the engine starting.

3. The method of claim 2, wherein adjusting the engine speed based on the future gear of the transmission shift includes adjusting the engine speed to a synchronous speed of the future gear of the transmission shift.

4. The method of claim 3, wherein adjusting the engine speed includes adjusting one or more of spark timing, throttle angle, and fuel injection based on the future gear of the transmission shift.

5. The method of claim 4, wherein the spark timing adjustment and the throttle angle adjustment are based on motor speed, the spark timing retarded and the throttle opening decreased at lower motor speeds, the spark timing advanced and the throttle opening increased at higher motor speeds.

6. The method of claim 4, wherein the transmission shift is a transmission downshift, and wherein the adjusting includes one of decreasing an amount of spark retard, increasing an amount of spark advance, decreasing throttle angle, and decreasing fuel injection based on the synchronous speed of the future gear of the transmission downshift being lower.

7. The method of claim 6, wherein closing the disconnect clutch includes closing the disconnect clutch when the engine speed is at or within a threshold of the synchronous speed.

8. The method of claim 7, wherein a degree of slippage of the partially open disconnect clutch is adjusted based on the engine speed relative to the synchronous speed.

9. The method of claim 8, further comprising, after closing the disconnect clutch, propelling the hybrid vehicle with at least engine torque.

* * * * *